Figure 1:
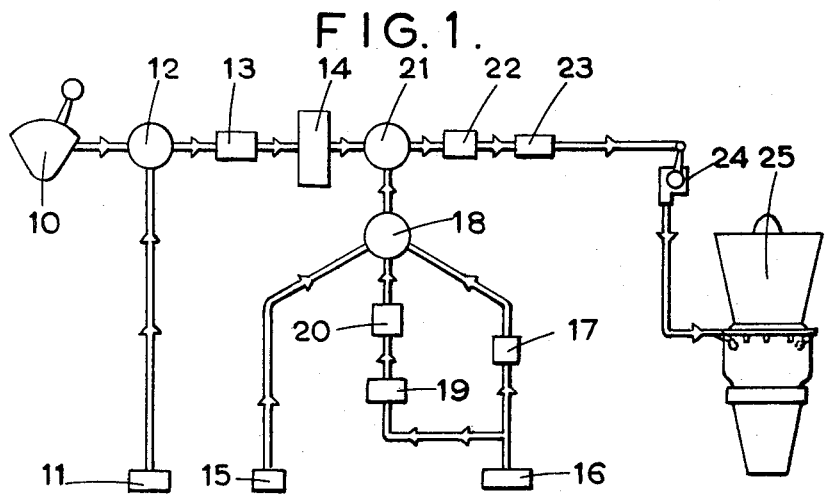

July 19, 1960  E. METCALF ET AL  2,945,649

AIRCRAFT CONTROL SYSTEMS

Filed Aug. 22, 1956  4 Sheets-Sheet 1

Eric Metcalf
Henry Cook
Inventors by Leech and Radice

Attorneys

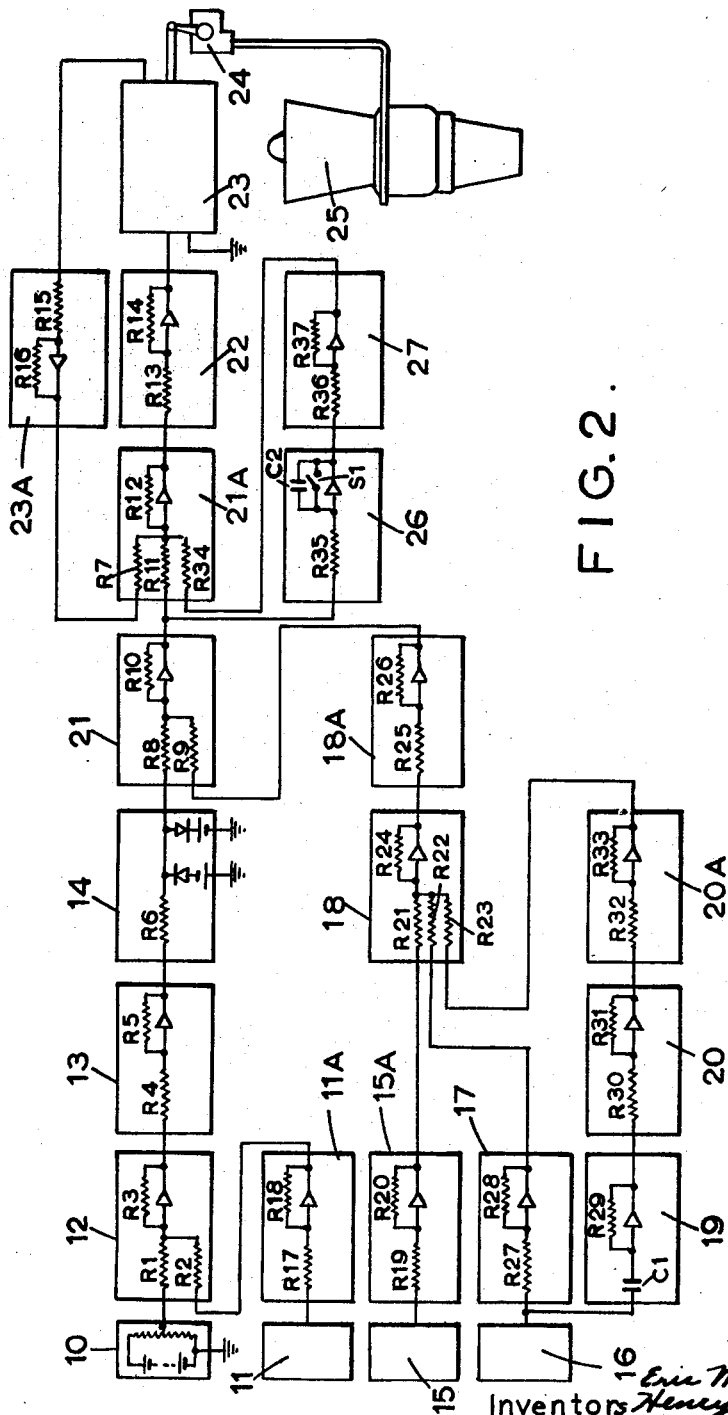

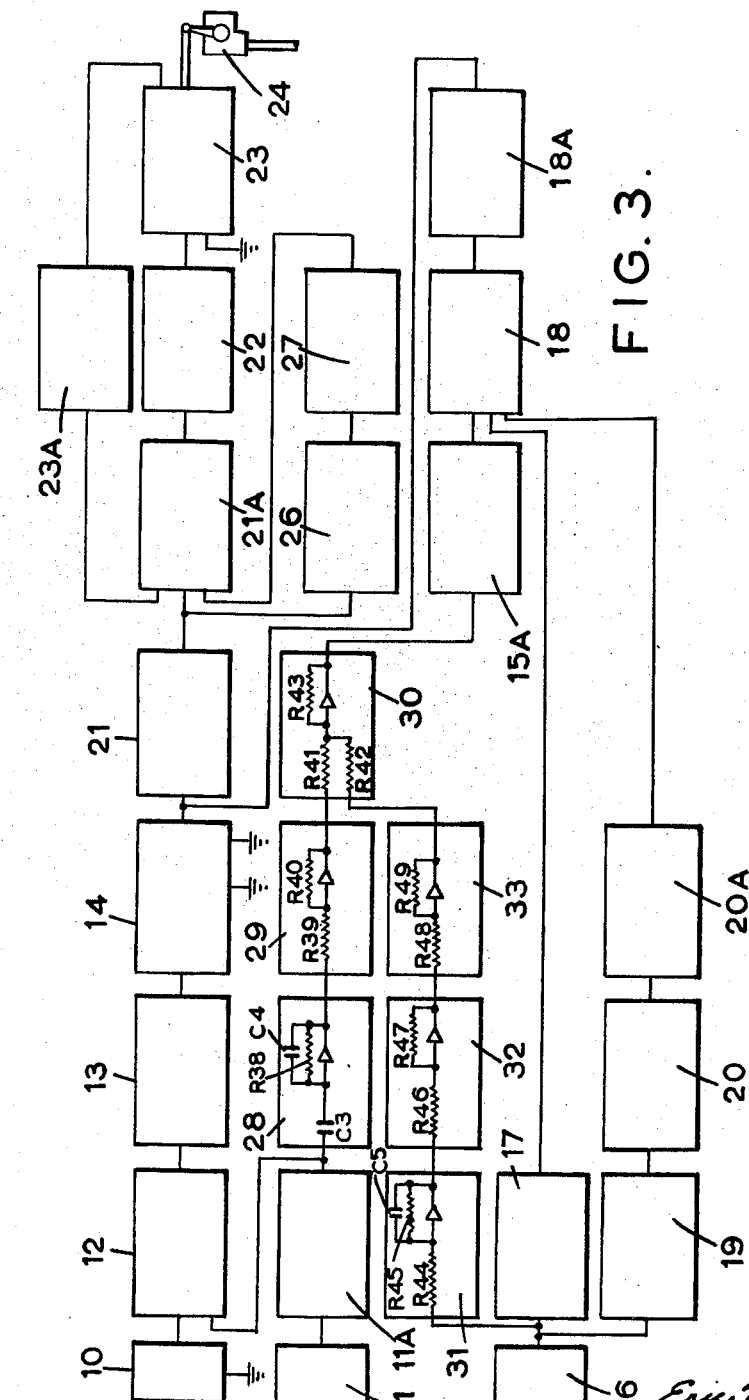

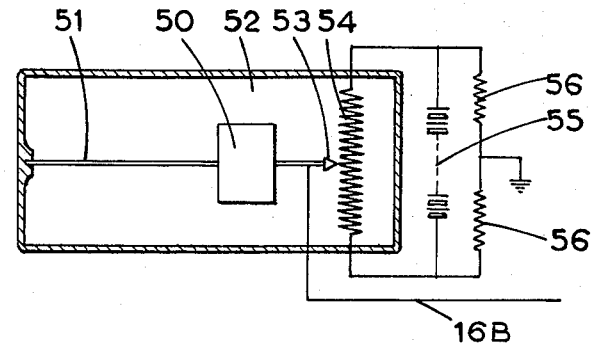
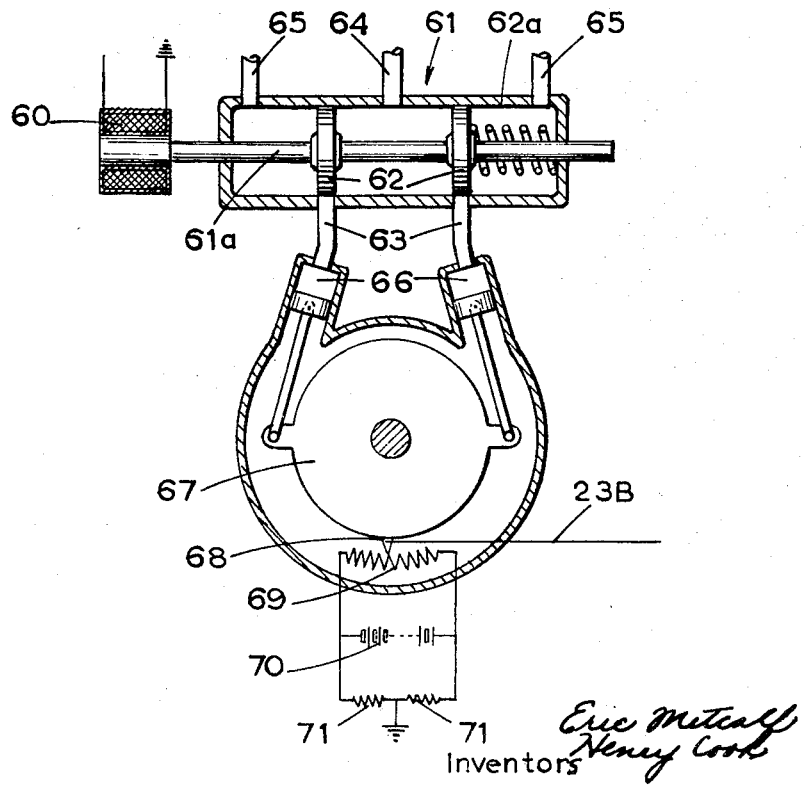

United States Patent Office 2,945,649
Patented July 19, 1960

2,945,649
AIRCRAFT CONTROL SYSTEMS

Eric Metcalf and Henry Cook, Derby, England, assignors to Rolls-Royce Limited, Derby, England, a British company Filed Aug. 22, 1956, Ser. No. 605,665

Claims priority, application Great Britain Sept. 1, 1955

15 Claims. (Cl. 244—77)

This invention relates to control systems for aircraft and is particularly concerned with control systems for aircraft of the type on which a lift force exceeding the weight of the aircraft may be exerted independently of aerodynamic lift due to forward flight. Such an aircraft, which includes for example the type known as jet lift aircraft, will be referred to as "aircraft of the type described."

It is an object of the present invention to provide a control system for an aircraft of the type described which facilitates control of the aircraft particularly under conditions of vertical landing and take-off and during hovering flight.

According to the present invention an automatic control system for an aircraft of the type described comprises means operable to select the height at which it is desired to position the aircraft and adapted to produce a signal which is a measure of the desired height, altimeter means responsive to the actual height of the aircraft and adapted to produce a signal which is a measure of the actual height, comparator means adapted to receive the signals from the selector means and from the altimeter means and adapted to produce an output which is a measure of the difference between the two signals, means to amplify said output, vertical-velocity-measuring means responsive to the vertical velocity of the aircraft and adapted to produce a signal which is a measure of said vertical velocity, means to add the algebraic sum of the amplified output from the comparator means and the signal from the vertical-velocity-measuring means, means to amplify the output from said adding means, actuator means operated by the amplified output, and vertical-thrust-varying means connected to the actuator means to be operated thereby to vary the vertical thrust acting on the aircraft, the arrangement being such that signals due to a positive difference between the selected height and the actual height result in an increase of the vertical thrust, and that signals due to upward vertical velocity result in a decrease of the vertical thrust.

Where the vertical thrust is produced by jet lift engines the thrust-varying means is conveniently a throttle valve controlling the supply of fuel to the engines.

According to an optional feature of the invention the automatic control system also comprises vertical-acceleration-measuring means responsive to the vertical acceleration, means to amplify said signal, the amplified signal being fed to the adding means to be added algebraically to the output signal from the comparator means and to the signal from the vertical-velocity-measuring means, the arrangement being such that signals due to upward acceleration result in a decrease of the vertical thrust.

According to another optional feature of the invention the automatic control system also comprises means for measuring the rate of change of acceleration, for example, by differentiating the acceleration signal or by an instrument which measures directly the rate of change of acceleration, the arrangement being such that signals representative of rate of change of acceleration corresponding to an increasing upward acceleration result in a decrease of the vertical thrust.

It will be apparent that the control system in accordance with the invention is essentially a height control, in that the pilot selects the height at which it is desired to position the aircraft and this is automatically compared with the height sensed by the altimeter means, the vertical thrust being increased if the aircraft is lower than the selected height and being decreased if the aircraft is above the selected height. The velocity and acceleration signals which are fed into the automatic control system may be considered as providing a measure of anticipation so that over-shooting of the selected height is reduced or avoided.

Preferably the signals produced by the altimeter means, by the vertical-velocity-measuring means, and by the vertical-acceleration-measuring means are in the form of electrical potentials which are directly proportional to the quantity which they represent at least over the operating range.

Thus the potential fed to the actuator will, where the height-responsive means, the vertical-velocity-responsive means, and the vertical-acceleration-responsive means are all incorporated, be a function of the required vertical velocity minus the actual vertical velocity as modified by the acceleration term and by further time derivatives where a differentiating circuit or circuits are included.

According to yet another feature of the invention there may be provided means to limit the magnitude of the signal representing the difference between the selected height and the actual height of the aircraft. In this way the maximum demanded vertical velocity of the aircraft may be limited. In one arrangement in accordance with this feature of the invention there may be provided means whereby for the purpose of landing the aircraft a small height may be selected, say a height of 15 feet, and the means to limit the vertical velocity of the aircraft may be set so that both the upper and lower limits of the vertical velocity are negative, for example the upper limit of the velocity may be minus 2 feet per second (i.e. a descent of 2 feet per second) and the lower limit may be minus 20 feet per second.

According to yet another feature of the invention there may be provided additionally means to produce a signal which is proportional to the integral of the output from the adding means with respect to time, the integral signal being additionally added algebraically to the sum of the other signals, and the total signal being fed to the actuator.

Each of the means producing a signal which is fed to the adding means will conveniently have incorporated means for amplifying the signal so arranged as to introduce into each signal the desired constants which determine the relative magnitude of the signals.

Figure 4:
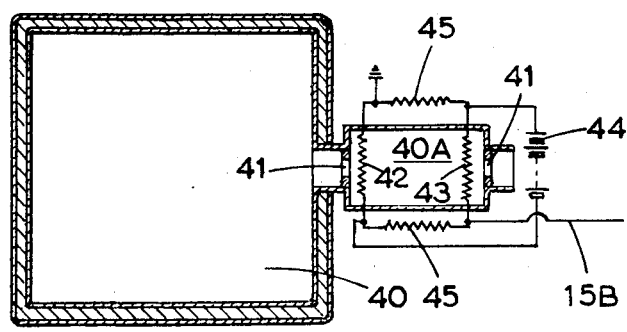

An example of this invention is illustrated in the accompanying drawings in which Figure 1 is a diagram of a control installation according to this invention, Figure 2 is a circuit diagram of the controls illustrated in Figure 1, Figure 3 is a circuit diagram of an alternative arrangement, Figure 4 is a diagrammatic illustration of a velocity meter, Figure 5 is a diagrammatic illustration of an accelerometer, Figure 6 is a diagrammatic illustration of a throttle control.

In Figures 2 and 3 the parts are conventionally illustrated, the amplifying circuits being indicated by a triangle.

The invention will be described in relation to an aircraft having a number of jet lift engines which are disposed to produce an upward thrust on the aircraft, and also having one or more propulsion engines which are disposed so as to exert a thrust on the aircraft in the direction of its normal flight.

Such an aircraft is shown for instance in the Rolls-Royce British Patent 720,394 published December 22, 1954, in Dorneir U.S. Patent 1,443,567 published in 1921 or in the U.S. patent to Kiss 1,826,938 published October 13, 1931, and in many others.

It will be appreciated that the jet lift engines are started prior to take-off in normal operation and that, for the purpose of taking-off, the thrust of these engines is increased until it exceeds the weight of the aircraft. The latter then rises vertically into the air. When the aircraft is airborne a forward thrust may be provided by the propulsion engine or engines, and although these may be started prior to take-off they will normally be running at idling speed and thus developing little thrust during take-off. In certain cases the jet lift engines may have their axes inclined to the vertical, for example after the completion of the take-off in order to produce a forward component of thrust to assist the aircraft in climbing away.

During the landing procedure the jet lift engines will normally be started prior to landing, and may be inclined at an angle to the vertical to provide a rearward component of thrust while the aircraft approaches the landing ground. Before landing, the engines will be moved to the vertical position and the propulsion engine or engines will be shut down or reduced to idling speed so that they exert little thrust during the landing manoeuvre.

It will be appreciated that the automatic control system in accordance with the invention will facilitate control of the aircraft during take-off and landing, and also in hovering flight.

It may also be mentioned that the rate of fuel consumption of the jet lift engines is very high, because the engines must develop a thrust which will normally be substantially equal to the weight of the aircraft and are normally of comparatively simple design for the sake of lightness, since they are not used during cruising flight. It is therefore particularly desirable to provide a control system to enable the aircraft to be accurately positioned in relation to the ground during the landing and take-off manoeuvres, so as to reduce to a minimum the time during which the jet lift engines are running.

The control system includes a height selector 10 under the control of the pilot which produces a signal in the form of an electrical potential which is directly proportional to the height selected. The height selector 10 feeds to a comparator or adder 12 through a resistance R1. There is also provided a radio altimeter 11 of well-known form and this is arranged to produce a potential which is directly proportional to the actual height of the aircraft. The radio altimeter signal is fed to the resistance R2 of the adder 12 through a phase change amplifier 11A which shifts the phase of the output 180° to change its sign. The output of adder 12 is therefore proportional to the difference between the selected height and the actual height. It will be appreciated that the term "height" is used to mean the vertical distance of the aircraft above the surface immediately below it, which will be assumed to be ground level. The difference between the selected height and the actual height determines the required vertical velocity.

The required vertical velocity may for example be directly proportional to the difference in the heights and may be represented by the expression $Vi = L(hi - ho)$, where $Vi$ is the required vertical velocity, $hi$ is the selected height, $ho$ is the actual height, and $L$ is a constant.

The output from the adder 12 is fed to a coefficient amplifier 13 having resistances R4 and R5 and thence to an output limiter 14 which limits its magnitude. For example the potential may be limited to a maximum value corresponding to a vertical velocity of 20 feet per second upwards and to a minimum value corresponding to a vertical velocity of minus 20 feet per second, i.e. 20 feet per second downwards. The limits may however be adjustable as described hereinafter.

The output limiter 14 comprises a resistance R6 and a biassed diode circuit.

The control system also comprises a vertical velocity meter or rate-of-climb meter 15 more particularly illustrated in Figure 4. This meter is arranged to produce an electrical potential which is directly proportional to the vertical velocity of the aircraft. It is preferred that this should be independent of the radio altimeter 11, but as described with reference to Figure 3 the vertical velocity signal may be obtained by means of a differentiating circuit connected to the radio altimeter. The output from meter 15 is fed to a phase change coefficient amplifier 15A having resistances R19 and R20 and the output from 15A is fed to resistance R21 of an adding amplifier 18.

The control system further comprises an electrical accelerometer 16 (more particularly illustrated in Figure 5) arranged to measure the vertical acceleration of the aircraft, and arranged to produce an electrical potential directly proportional to the vertical acceleration.

The output from the accelerometer 16 is fed to an amplifier 17 having resistances R27 and R28 and the amplified signal is fed to resistance R22 of adder 18. The output from the accelerometer 16 is also fed through a capacitor C1 of a differentiator 19 having resistance R29 where it is differentiated with respect to time, thence through coefficient amplifier 20 (having resistances R30 and R31), phase change amplifier 20A (having resistances R32 and R33) to resistance R23 of adder 18.

In the adder 18 the outputs from the vertical velocity meter 15 and from the accelerometer 16, and also from the differentiating circuit 19, are added algebraically, that is to say with regard to sign, the upward direction being conveniently considered as positive.

The output from the adder 18 is fed through a phase change amplifier 18A (with resistances R25 and R26) to resistance R9 of an adding amplifier 21. The signal which is representative of the required vertical velocity is fed from output limiter 14 to resistance R8 of adder 21. It will thus be appreciated that the output from the adder 21 may be written in the form $$Vi - (Vo + k1a_0 + K2Da_0)$$

where $Vi$ is the required vertical velocity, $Vo$ the actual vertical velocity as measured by the vertical velocity meter 15, $a_0$ is the vertical acceleration measured by the accelerometer 16, and $Da_0$ the differential of the vertical acceleration obtained from the differentiating circuit 19. This output is fed to resistance R11 of an adder 21A the output of which is fed to an amplifier 22 having resistances R13 and R14. The output from amplifier 22 is fed to the solenoid of an actuator device 23 connected to the throttle 24 of the lift engine or engines 25.

Actuator 23 contains a potentiometer (hereinafter described) the voltage output of which is fed back through resistance R15 of a feed back amplifier 23A to resistance R7 of adder 21A, to provide that the movement of the output member of the actuator is proportional to the input signal in well known manner.

There is also provided an integrating device 26 having resistance R35 and capacitor C2 which is connected to the output side of the adder 21 and which integrates with respect to time the signal received from the adder. The integrated signal is fed to resistance R36 of phase change amplifier 27 containing also resistance R37 and then to resistance R34 of adder 21A. Thus the potential fed to the actuator 23 may be represented by one term which is a function of the required vertical velocity as modified by the actual velocity, acceleration and rate change of acceleration, plus a second term which is a function of the integral of the first term with respect to time.

The object of the integrator 26 is to provide a long term reset action to eliminate errors in height caused by changes in weight of the aircraft, for example, due to consumption of fuel, which necessitates a change in the steady state throttle position. The integrator 26 ensures that the steady state height error will always be zero. To prevent build-up of the integrator output when the aircraft is on the ground means such as switch S1 in integrator 26 is provided to short circuit the capacitor C2.

As an alternative to using a separate accelerometer 16 the acceleration signal may be obtained by differentiating the vertical velocity signal from the vertical velocity meter 15.

The circuit illustrated in Figure 3 in the main is similar to that of Figure 2. In this case however the vertical velocity meter 15 is dispensed with and the velocity signal is provided by differentiating the smoothed height signal obtained from the radio altimeter 11 augmented by the smoothed acceleration signal from the accelerometer 16 to restore information lost by smoothing the height signal.

To achieve this the height signal from the phase change amplifier 11A is fed to capacitor C3 of a smoothed differentiator 28 containing also resistance R38 and capacitor C4. The signal from differentiator 28 is then taken to resistance R39 of phase change coefficient amplifier 29 containing also resistance R40 and then to resistance R41 of an adder 30 containing also resistances R42 and R43. The acceleration signal from accelerometer 16 is smoothed by a lag circuit 31 containing resistances R44 and R45 and capacitor C5 and is taken to resistance R46 of a coefficient amplifier 32 containing also resistance R47 and then to resistance R48 of a phase change amplifier 33 containing also resistance R49. The output from phase change amplifier 33 is taken to resistance R42 of the adder 30. The output of this adder, which is taken to resistance R19 of phase change coefficient amplifier 15A as in Figure 2, is a composite signal representing the vertical velocity of the aircraft, the lower frequency components having originated from radio altimeter 11 and the higher frequency components having originated from accelerometer 16.

It will be noted that apparatus having reference numerals 10, 11, 11a, 12, 13, 14, 15a, 16, 17, 18, 18a, 19, 20, 20a, 21, 21a, 23 and 23a, 26 and 27 correspond directly with that illustrated in Figure 2.

It will be appreciated that this method of obtaining the velocity signal not only minimises the effect of noise from the altimeter but also the effect of short term errors in the signal derived from differentiation of the height signal, for example, due to uneven conditions of the terrain, though not to the same extent as by using a separate velocity meter.

In the circuits illustrated in Figures 2 and 3 the values of all the resistances (indicated by the letter R) are 1 megohm and of all the capacitances (indicated by the letter C) are 1 microfarad except the following:

| Resistance: | Resistance, megohms |
| --- | --- |
| R.5 | 0.33 |
| R.6 | 0.25 |
| R.14 | 9.00 |
| R.16 | 0.28 |
| R.28 | 1.03 |
| R.31 | 0.35 |

These values have been found appropriate for controlling an engine of the centrifugal compressor type used to provide vertical thrust on aircraft.

A vertical velocity or rate-of-climb (and descent) meter 15 is diagrammatically illustrated in Figure 4. The meter comprises a lagged chamber 40 which leads to a second and smaller chamber 40A having a restricted orifice 41 at each end. Change of altitude causes a flow of air through the orifices 41 and chamber 40A into or out of chamber 40 to equalise the pressure within chamber 40 with that of the ambient atmosphere. Thus air flows out of chamber 40 on increase of altitude and into the chamber on decrease of altitude. In chamber 40A are placed hot wire anemometer resistances 42 and 43 respectively in line with the flow of air from the adjacent orifice 41. Resistances 42 and 43 are connected in a comparator circuit comprising comparator resistances 45 and voltage source 44. The output from the comparator is taken by lead 15B to phase change coefficient amplifier 15A of Figure 2. The output of the comparator is a measure of the difference in temperature between the resistances 42 and 43 produced by the air flow over them and is thus a measure of vertical velocity, and the sense of the output depends on the direction of air flow through chamber 40A, resistance 43 being hotter than resistance 42 on increase of altitude, and vice versa.

The vertical accelerometer 16 is diagrammatically illustrated in Figure 5. This comprises a weight 50 supported on a resilient cantilever arm 51 in a chamber support structure 52. The end of the arm 51 is diagrammatically illustrated to comprise a potentiometer contact 53 operating on a potentiometer resistance 54. The circuit including the resistance 54 further comprises a voltage source 55 and network resistances 56. The output indicated at 16B is a measure of vertical acceleration. It will be understood that assuming the apparatus to be mounted in the aircraft horizontally, as shown, a vertical acceleration causes deflection of the cantilever arm 51, moving the potentiometer contact over the potentiometer resistance 54 to an extent which is dependent upon the value of the vertical acceleration. The movement of the weight in the chamber 52 is preferably damped viscously, or alternatively by the well-known methods of eddy current damping.

The actuator device 23 is illustrated in Figure 6 having a plunger operating in a magnetic coil 60 to which the potential derived from the amplifier 22 is applied and having the plunger connected to operate a piston-type valve 61. The valve comprises a rod 61a having a pair of lands 62 each co-operating with the bore of a sleeve 62a so that, in the equilibrium position, the lands cover outlet holes 63 formed in the sleeve. Oil or other suitable fluid is supplied under pressure through an inlet port 64 in the sleeve mid-way between the two outlet holes, and drain ports 65 are formed in the sleeve on the sides of the respective outlet ports remote from the inlet port. Thus, on movement of the piston valve in one sense one outlet port is connected through the inlet port to the source of pressure and the other is connected to a drain port, and on movement in the opposite sense the second outlet port is connected to the pressure port and the first to the drain port. The outlet ports are connected to a pair of pressure spaces 66 of a hydraulic motor, which is of the semi-rotary type, and so arranged that the application of pressure in one space causes rotation in one direction and the application of pressure in the other space causes rotation in the other direction. The rotating part 67 of the motor is connected to the throttle valve 24 controlling the fuel supply to the combustion equipment of the lift engines.

The rotating part carries a potentiometer contact 68 co-operating with a potentiometer resistance 69 connected in a circuit including a voltage source 70 and network resistances 71. The output from the potentiometer circuit is shown at 23B and is fed back to the adder 21A of Figures 2 and 3.

There may be provided in addition a manually-controllable throttle lever which may be connected to the throttle valve, and it will be arranged that this lever is capable of overriding the automatic control; for example the actuator device may be declutched as the manual control is operated.

It is known that there is a lag between the time at which the impulse is fed to the actuator 23 to vary the thrust and the time at which the thrust reaches a new value in response to the impulse. The lag is due partly to the delay in varying the rate of fuel supply in response to the impulse and partly to the delay associated with the acceleration or deceleration of the engine to run at the speed corresponding to the new thrust. The lag between the time at which the impulse is fed to the actuator and the time when the actuator operates the throttle may be selected so as to perform a useful function in the operation of the whole system, the magnitude of the lag being chosen as a compromise between obtaining the maximum smoothing of random impulses generated by the altimeter 11, vertical velocity meter 15 and accelerometer 16 and obtaining a new equilibrium condition of the system in a short time.

The automatic control system just described works as follows. Let it be assumed that the height selected by means of device 10 has suddenly been increased by 10 feet at zero time. Then assuming that the aircraft was previously at the height selected, the difference between the selected height and the actual height is 10 feet and an electrical potential proportional to this difference will be fed by the comparator circuit 12 to the associated amplifier 13 where the signal is amplified in a predetermined ratio. This signal is passed to the actuator 23 and causes the throttle 24 to be opened so that the engine speed increases and a greater upward thrust acts on the aircraft. It will be appreciated that as the aircraft rises towards the selected height the signal, which is proportional to the difference between the selected height and the actual height, dies away.

As the aircraft rises a signal proportional to its vertical velocity will be produced by the vertical velocity meter 15 and this signal is also fed to the actuator 23 but acts in the opposite sense to the signal from amplifier 13. Thus, before the selected height is reached, the signal from the vertical velocity meter 15 will become equal to the signal representing the required vertical velocity and the potential fed to the actuator will thus tend to cause the throttle valve 24 to be moved to its equilibrium position. As the signal representing the actual vertical velocity exceeds the signal representing the required vertical velocity the thrust will tend to be reduced and the aircraft while still moving upwards will tend to decelerate until it reaches the selected height where, of course, it is desirable to arrive with no vertical velocity.

Superimposed on the potential representing the actual rate of climb is a further potential obtained from the accelerometer 16 and representing the vertical acceleration of the aircraft, and like the signal representing the vertical velocity this is also in opposition to the signal representing the required vertical velocity. Thus the greater the upward acceleration of the aircraft at a given actual vertical upward velocity, the sooner will the combined signal become equal to the signal representing the required vertical velocity and the sooner will the actuator 23 be caused to move the throttle 24 to decrease the thrust. The signal produced by the accelerometer 16 may therefore be best described as an anticipatory measure of the velocity. If as illustrated a differentiating circuit 19 is incorporated to differentiate the signal received from the accelerometer 16, the output from the differentiating circuit 19 bears a similar relation to the signal representing the acceleration as the acceleration signal does to the signal representing the vertical velocity. The amplification ratio of the signal representing the acceleration and of that from the differentiating circuit 19 will usually however be different.

In Figure 3 as previously described the function of the vertical velocity meter is replaced in manner described with reference to that figure.

Thus an electrical potential which varies in a complex manner with time is fed to the actuator 23 and, as mentioned above, it may be arranged that movement of the throttle 24 by the actuator 23 lags behind the corresponding input signal to the actuator by a short time delay.

The thrust developed by the engine 25 also lags behind the movement of the throttle 24 and it will be appreciated that if the mass of the aircraft is assumed to be constant a change in the thrust from the value required to overcome the gravitational acceleration on the aircraft represents a directly proportional upward or downward acceleration of the aircraft. Thus, in this example, the thrust first of all increases and then decreases to somewhat below its equilibrium value, causing a corresponding upward acceleration of the aircraft followed by a decrease in upward acceleration and a slight downward acceleration as the aircraft approaches the selected height. The vertical velocity of the aircraft also, as will be clear, rises to a peak and then decreases for a period as the acceleration reverses its direction.

It will be appreciated that with the system described above, the equilibrium throttle position will always be directly related to the difference between the selected height and the actual height of the aircraft; thus, if the aircraft is hovering and, for example, heavy cargo is off-loaded the aircraft will tend to rise because the thrust is now greater than the weight and as the selected height is unaltered the throttle will remain in the same position. As described above an integrating device is incorporated and it is arranged that in addition to the signal which is a function of the required vertical velocity as modified by the actual vertical velocity and by the acceleration of the aircraft, there is also produced a signal which is proportional to the integral of this signal with respect to time. The sum of the original signal and its integral is fed to the actuator. When the aircraft tends to rise or descend after an alteration of weight due for example to off-loading cargo, the difference between the selected height and the actual height becomes no longer equal to zero and the signal due to the integral increases continuously from the time of the alteration of weight. The total signal is therefore fed to the actuator in the sense to reduce the engine thrust in the example given, and the magnitude of the difference between the selected height and the actual height which is required to feed the necessary thrust-decreasing signal to the throttle is continuously reduced until it reaches zero, corresponding to the aircraft having been restored to the height it started from.

In another modification which is particularly suitable for automatic landing of the aircraft, there is provided a device, such as device 14, which limits the potential representative of the required vertical velocity, that is of the difference between the selected height and the actual height, so that both the maximum and minimum values of the potential are negative. For example, the upper limit of the velocity may be minus 2 feet per second (a descent of 2 feet per second) and the lower limit may be minus 20 feet per second. At the same time the height selector 10 is set to a small height above the ground, say a height of 15 feet. With this combination of settings the basic signal will tend to cause the aircraft to descend to an altitude of 15 feet above the ground, the magnitude of the required rate of descent decreasing as the aircraft approaches the selected altitude. Owing to the setting of the velocity limits however, instead of the aircraft finally attaining a height of 15 feet a signal corresponding to a required velocity of minus 2 feet per second will continue to be applied and it will sink slowly to ground level.

A further modification which may be included in the basic system described is that a filter circuit such as that at 31 in Figure 3 may be incorporated to damp out oscillations in the potential produced by the radio altimeter 11. Such means will, however, have the effect of causing a relatively slow response to a large step change in selected altitude and to compensate for this slow response a similar damping circuit may be incorporated in the output of the vertical velocity meter 15 to provide a signal therefrom which is delayed in the same fashion in addition to the normal vertical velocity signal. This is, of course, only possible if a vertical velocity meter 15 independent of the radio altimeter 11 is incorporated as in Figure 2. The signals due to the actual height and the actual vertical velocity are additive in their effect since both are ultimately subtracted from the signal representing the selected height. Thus it will be clear that the signal due to the difference between the selected height and the actual height, on a sudden change in height, will be augmented over a longer period by the signal which arises from the damping of the sharply peaked actual velocity signal.

In place of obtaining a signal representative of rate of change of acceleration by differentiating the signal produced by the accelerometer 16, as in Figures 2 and 3, a separate instrument may be employed to measure rate of change of acceleration directly. This instrument may take the form of a chamber containing a magnet and a member of magnetic material arranged such that relative movement between the magnetic member and magnet in the direction of acceleration may occur on change of acceleration, the relative position of the magnetic member and magnet being determined by a spring. On such relative movement a coil in the chamber will produce a potential differences due to cutting of lines of magnetic flux, the potential difference being a measure of the rate of cutting of the lines of flux and thus of the rate of change of acceleration. The chamber may be filled with fluid to provide viscous damping.

We claim:

1. An automatic control system for an aircraft capable of direct vertical ascent, descent and hovering which comprises means manually operable to select the height at which it is desired to position the aircraft and constructed to produce an electrical signal whose magnitude is a measure of the desired height, altimeter means responsive to the actual height of the aircraft and constructed to produce an electrical signal whose magnitude is a measure of the actual height, comparator means connected to receive the signals from the selector means and from the altimeter means and constructed to produce an output which is a measure of the difference between the two signals, means to amplify said output, vertical-velocity-measuring means responsive to the vertical velocity of the aircraft and adapted to produce an electrical signal whose amplitude is a measure of said vertical velocity, means to add the algebraic sum of the amplified output from the comparator means and the signal from the vertical-velocity-measuring means, means to amplify the output from said adding means, actuator means operated by the amplified signal output in accordance with its magnitude, and vertical-thrust-producing means connected to the actuator means to be controlled thereby to vary the vertical thrust acting on the aircraft, the actuator, thrust-producing connection being such that signals due to a positive difference between the selected height and the actual height result in an increase of the vertical thrust, and that signals due to upward vertical velocity result in a decrease of the vertical thrust.

2. An automatic control system as claimed in claim 1 which also comprises vertical-acceleration-measuring means responsive to the vertical acceleration and adapted to produce an electrical signal whose amplitude is a measure of such acceleration, means to amplify said signal and feed the amplified signal to said adding means for addition algebraically to the output signal from the comparator means and to the signal from the vertical-velocity-measuring means, the arrangement being such that signals due to upward acceleration result in a decrease of vertical thrust.

3. An automatic control system as claimed in claim 2 which also comprises a circuit connected to said vertical-acceleration-measuring means output to differentiate the same and deliver its output to said adding means, the arrangement being such that signals from the differentiating circuit corresponding to an increasing upward acceleration result in a decrease of the vertical thrust.

4. An automatic control as claimed in claim 2 in which the signals produced by the altimeter means, by the vertical-velocity-measuring means, and by the vertical-acceleration-measuring means are in the form of electrical potentials which are directly proportional to the quantity which they represent at least over the operating range.

5. An automatic control as claimed in claim 4 in which means are provided which limit the magnitude of the signal representing the difference between the selected height and the actual height of the aircraft.

6. An automatic control as claimed in claim 5 having a device which so limits the potential of the said signal that both its maximum and minimum values are always negative.

7. An automatic control as claimed in claim 4 in which means are provided and connected for smoothing the signal output from the vertical acceleration and measuring means and means are provided and connected for differentiating the height signal from the altimeter, and means to add the smoothed acceleration signal and the differentiated height signal algebraically to produce a signal representative of vertical velocity.

8. An automatic control as claimed in claim 4 having means to combine the signal which is a function of the required vertical velocity resulting from combining the actual and selected heights signals, means to modify the combined signal by the signal representative of the actual vertical velocity and by the signal representative of the acceleration of the aircraft, and means to integrate this twice modified signal with respect to time to produce a resultant signal proportional to the integral of the last mentioned signal.

9. An automatic control as claimed in claim 1 in which apparatus is provided in which the vertical velocity signal is obtained from a vertical velocity indicator whose output is a potential representative of velocity and a signal corresponding to the actual height of the aircraft from a radio altimeter whose output is a potential representative of altitude.

10. An automatic control as claimed in claim 1 in which the signal corresponding to the aircraft's height is obtained from a radio altimeter and the vertical velocity signal by means of a differentiating circuit for the output of said radio altimeter.

11. An automatic control as claimed in claim 1 for jet lift engines disposed to discharge the effluent downwards to produce an upward thrust on said aircraft, a single throttle for said engines, and means connecting said signal controlled actuator to said throttle.

12. An automatic control as claimed in claim 11 in which the signal energizes a solenoid in said actuator, an hydraulic motor to regulate the vertical lift engines whereby they are accelerated or decelerated, and means placing said solenoid in control of the direction and amplitude of movement of said motor.

13. An automatic control as claimed in claim 12 having a potentiometer, means connecting said potentiometer for adjustment by said hydraulic motor, a source of electricity energizing said potentiometer, means delivering the output of said potentiometer to means for adding its signal to those energizing said solenoid whereby to produce a unique position for the actuator output member for each value of signal applied to the actuator.

14. An automatic control as claimed in claim 1 having a signal comparator and a radio altimeter and in which the signal from the height selecting means is fed to said comparator, a phase change amplifier, means feeding the signal from said radio altimeter through said phase changer amplifier to said comparator, an amplifier for the signal from said comparator delivering it to an output limiter and said limiter delivering the composite signal for combination with others to an adding device.

15. An automatic control as claimed in claim 1 in which means are provided to damp out oscillations in the signal potential produced by said means which measure the actual height of the aircraft and separate damping means for the signals that derive from the vertical velocity meter.

References Cited in the file of this patent

UNITED STATES PATENTS

| | | |
|---|---|---|
| 1,826,938 | Kiss | Oct. 13, 1931 |
| 2,507,304 | Hofstadter | May 9, 1950 |